(12) United States Patent
Aso

(10) Patent No.: US 11,014,175 B2
(45) Date of Patent: May 25, 2021

(54) CUTTING INSERT AND CUTTING TOOL

(71) Applicant: TUNGALOY CORPORATION, Fukushima (JP)

(72) Inventor: Takahiro Aso, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 118 days.

(21) Appl. No.: 16/444,876

(22) Filed: Jun. 18, 2019

(65) Prior Publication Data

US 2019/0381576 A1    Dec. 19, 2019

(30) Foreign Application Priority Data

Jun. 19, 2018    (JP) .............................. JP2018-115701

(51) Int. Cl.
*B23C 5/20*    (2006.01)
*B23C 5/10*    (2006.01)

(52) U.S. Cl.
CPC .............. *B23C 5/207* (2013.01); *B23C 5/109* (2013.01); *B23C 2200/20* (2013.01); *B23C 2200/286* (2013.01)

(58) Field of Classification Search
CPC ......... B23C 5/109; B23C 5/207; B23C 5/202; B23C 5/2213; B23C 5/2221;

(Continued)

(56) References Cited

U.S. PATENT DOCUMENTS 5,466,097 A * 11/1995 Wallstrom .............. B23C 5/207
407/113
2007/0071560 A1 * 3/2007 Karonen ................... B23C 5/06
407/34

(Continued)

FOREIGN PATENT DOCUMENTS

JP       2015100901 A * 6/2015
WO   WO-2014161658 A1 * 10/2014 ............. B23C 5/109

(Continued)

*Primary Examiner* — Ryan C Rufo
(74) *Attorney, Agent, or Firm* — Studebaker & Brackett PC

(57) ABSTRACT

In an end view, a cutting insert 10 comprises a first connecting part 30A which is inclined such that the first connecting part 30A travels in a first direction as it heads away from a second peripheral side surface part 18 and approaches a fourth peripheral side surface part 22, and also comprises a second connecting part 30B which is connected to a center point serving as an end of the first connecting part 30A and which is inclined such that the second connecting part 30B travels in a third direction as it heads away from the second peripheral side surface part 18 and approaches the fourth peripheral side surface part 22. A cutting edge 24 comprises: a first cutting edge part 24A which is formed on the first connecting part 30A so as to be distant, by a first distance L1, from a virtual plane PR1 including a center point C1; a second cutting edge part 24B which has, in a side view, a concave circular-arc shape having a second curvature radius smaller than a first curvature radius and which is formed on the second connecting part 30B so as to be distant, by a second distance L2 greater than the first distance L1, from the virtual plane PR1; and a third cutting edge part 24C connecting the first cutting edge part 24A and the second cutting edge part 24B.

7 Claims, 9 Drawing Sheets

(58) Field of Classification Search
CPC ...... B23C 2200/0494; B23C 2200/286; B23C 2200/20; B23C 2200/367
See application file for complete search history.

(56) References Cited

U.S. PATENT DOCUMENTS

| | | | |
|---|---|---|---|
| 2012/0009029 A1* | 1/2012 | Saji | B23C 5/207 |
| | | | 407/67 |
| 2012/0155976 A1* | 6/2012 | Ishi | B23C 5/202 |
| | | | 407/33 |
| 2017/0157685 A1 | 6/2017 | Mao | |
| 2017/0197259 A1* | 7/2017 | Kumoi | B23C 5/207 |
| 2019/0015910 A1 | 1/2019 | Mao | |
| 2019/0030629 A1* | 1/2019 | Vlcek | B23C 5/2221 |
| 2019/0160562 A1* | 5/2019 | Men | B23C 5/2221 |
| 2020/0361010 A1* | 11/2020 | Ishi | B23C 5/20 |

FOREIGN PATENT DOCUMENTS

| | | | | |
|---|---|---|---|---|
| WO | 2015/199031 A1 | 12/2015 | | |
| WO | 2016/047795 A1 | 3/2016 | | |
| WO | WO-2016186112 A1 * | 11/2016 | ............. | B23C 5/109 |
| WO | WO-2017051471 A1 * | 3/2017 | ............. | B23C 5/207 |

\* cited by examiner

CUTTING INSERT AND CUTTING TOOL

TECHNICAL FIELD

The present invention relates to a cutting insert and a cutting tool.

BACKGROUND ART

The cutting of a workpiece material, such as a metal, has been conventionally performed using a cutting insert mounted on a tool body.

WO2016/047795 discloses a cutting insert in which, in order to stably fix the cutting insert to a tool body, a peripheral side surface thereof is provided with surfaces inclined so as to head away from a central axis of a through hole and is also provided with surfaces parallel to the central axis. Further, the side view shown in FIG. 4 of WO2016/047795 illustrates a bell-shaped major cutting edge 9 which comprises, in a portion thereof which intersects with a central axis O1, a circular-arc-shaped cutting edge having a small curvature radius, with such cutting edge serving as the apex of the bell-shaped major cutting edge 9.

SUMMARY OF THE INVENTION

Technical Problem

However, if such circular-arc-shaped cutting edge having a small curvature radius is formed so as to serve such apex portion of the bell shape, the cutting edge is prone to fracture when the cutting edge bites a workpiece material through contact, and this invites a reduction in tool life.

The major cutting edge 9 is inclined such that: it has its apex at the central axis O1; and the height in the side view decreases as it heads away from the central axis O1 and approaches the outer periphery. Thus, chips are prone to move toward the outer periphery. Then, as in wall machining, when performing cutting in which a wall surface faces toward the outer periphery, chips may be trapped between a cutting insert and the wall surface so that the cutting insert may bite such chips.

In view of the above, an object of the present invention is to provide a cutting insert and a cutting tool which enable a cutting edge to be resistant to fracturing and which allow for improved chip discharging efficiency.

Solution to Problem

A cutting insert according to an aspect of the present disclosure comprises: a first end surface; a second end surface directed opposite to the first end surface; a peripheral side surface which connects the first end surface and the second end surface and which comprises a first peripheral side surface part facing in a first direction, a second peripheral side surface part facing in a second direction perpendicular to the first direction, a third peripheral side surface part facing in a third direction perpendicular to the second direction, and a fourth peripheral side surface part facing in a fourth direction perpendicular to the third direction; and a cutting edge formed in at least part of a connecting part between the first end surface and the first peripheral side surface part, and the cutting insert is relatively rotated around a predetermined rotational axis with respect to a workpiece material so that the cutting edge cuts the workpiece material.

Further, in an end view in which the cutting insert is seen from a direction facing the first end surface, the connecting part between the first end surface and the first peripheral side surface part comprises a first connecting part which is inclined such that the first connecting part travels in the first direction as it heads away from the second peripheral side surface part and approaches the fourth peripheral side surface part, and also comprises a second connecting part which is connected to a center point serving as an end of the first connecting part and which is inclined such that the second connecting part travels in the third direction as it heads away from the second peripheral side surface part and approaches the fourth peripheral side surface part. The cutting edge comprises: a first cutting edge part which has, in a side view seen from a direction facing the first peripheral side surface part, a convex circular-arc shape having a first curvature radius and which is formed on the first connecting part so as to be distant, by a first distance, from a virtual plane that is parallel to the first direction and the third direction and perpendicular to the second direction and the fourth direction, and that includes the center point; a second cutting edge part which has, in the side view, a concave circular-arc shape having a second curvature radius smaller than the first curvature radius and which is formed on the second connecting part so as to be distant, by a second distance greater than the first distance, from the virtual plane; and a bottom edge part formed so as to straddle the first connecting part and the second connecting part in order to connect the first cutting edge part and the second cutting edge part.

It is preferable that a rake angle of the cutting edge with respect to a second virtual plane which is perpendicular to the virtual plane and which passes through the first peripheral side surface part, the second peripheral side surface part, the third peripheral side surface part and the fourth peripheral side surface part has a positive value at a connecting point between the first cutting edge part and the bottom edge part, and gradually increases ranging from the connecting point to the center point.

It should be noted that the term "gradually increases" or "gradual increase" in the present invention refers to a gradual increase in a broad sense and thus encompasses not only a case where the value increases, which refers to a gradual increase in a narrow sense, but also a case where the value is constant.

Further, the first peripheral side surface part which constitutes the peripheral side surface and faces in the first direction in the present invention is not limited to a portion including a surface perpendicular or substantially perpendicular to the first direction. When the first peripheral side surface part is connected to its adjacent peripheral side surface part (for example, the second peripheral side surface part) via a curved surface having roundness, such connecting portion includes a surface inclined in the first direction, and, in an end view, a surface in which an angle formed by a normal and the first direction is smaller than an angle formed by the normal and the second direction corresponds to a surface facing in the first direction. Similarly, when the first peripheral side surface part is connected to the fourth peripheral side surface part via a curved surface having roundness, such connecting portion includes a surface inclined in the first plane, and in the end view, a surface in which an angle formed by a normal and the first direction is smaller than an angle formed by the normal and the fourth direction corresponds to a surface facing in the first direction. Each of the surfaces facing in the other directions has the same meaning. Further, the peripheral side surface parts are not required to be directly connected to one another and may instead be indirectly connected to one another via separate surfaces.

The term "circular-arc shape" in the present invention is intended to cover circular arcs in the technical field to which the invention belongs, and such term encompasses a circular arc in which the distance from the center to the arc is constant and a curve in which the distance from the center to the arc is substantially constant (e.g., the variation relative to the average value is less than 10%). Further, a convex circular-arc shape refers to a circular-arc shape which bulges outward, i.e., a circular-arc shape in which the center is located inside with respect to the surface, whereas a concave circular-arc shape refers to a circular-arc shape which is recessed inward, i.e., a circular-arc shape in which the center is located outside with respect to the surface.

The term "linear shape" is intended to cover straight lines in the technical field to which the invention belongs, and such term encompasses a straight line (encompassing a straight line involving a manufacturing error) or a substantially straight line (e.g., a curve in which, with respect to an approximate line, the amount of variation relative to the length of the approximate line has a predetermined value or less (e.g., less than 10%) or a set of straight lines and curves).

A cutting tool according to an aspect of the present disclosure comprises: a body rotated around a rotational axis and including an insert seat for holding a cutting insert; and the cutting insert mounted on the body such that the second end surface comes into contact with the insert seat.

A rotating tool, such as an end mill or a milling cutter, is preferable as a cutting tool.

DESCRIPTION OF EMBODIMENTS

Embodiments of the present invention will hereinafter be described with reference to the drawings. The embodiments below are illustrative in order to describe the present invention and are not intended to limit the present invention to such embodiments. Various modifications may be made to the present invention without departing from the gist of the invention. For example, some components in an embodiment may be incorporated into another embodiment within the extent of the ordinary creativity of a person skilled in the art.

Figure 1:
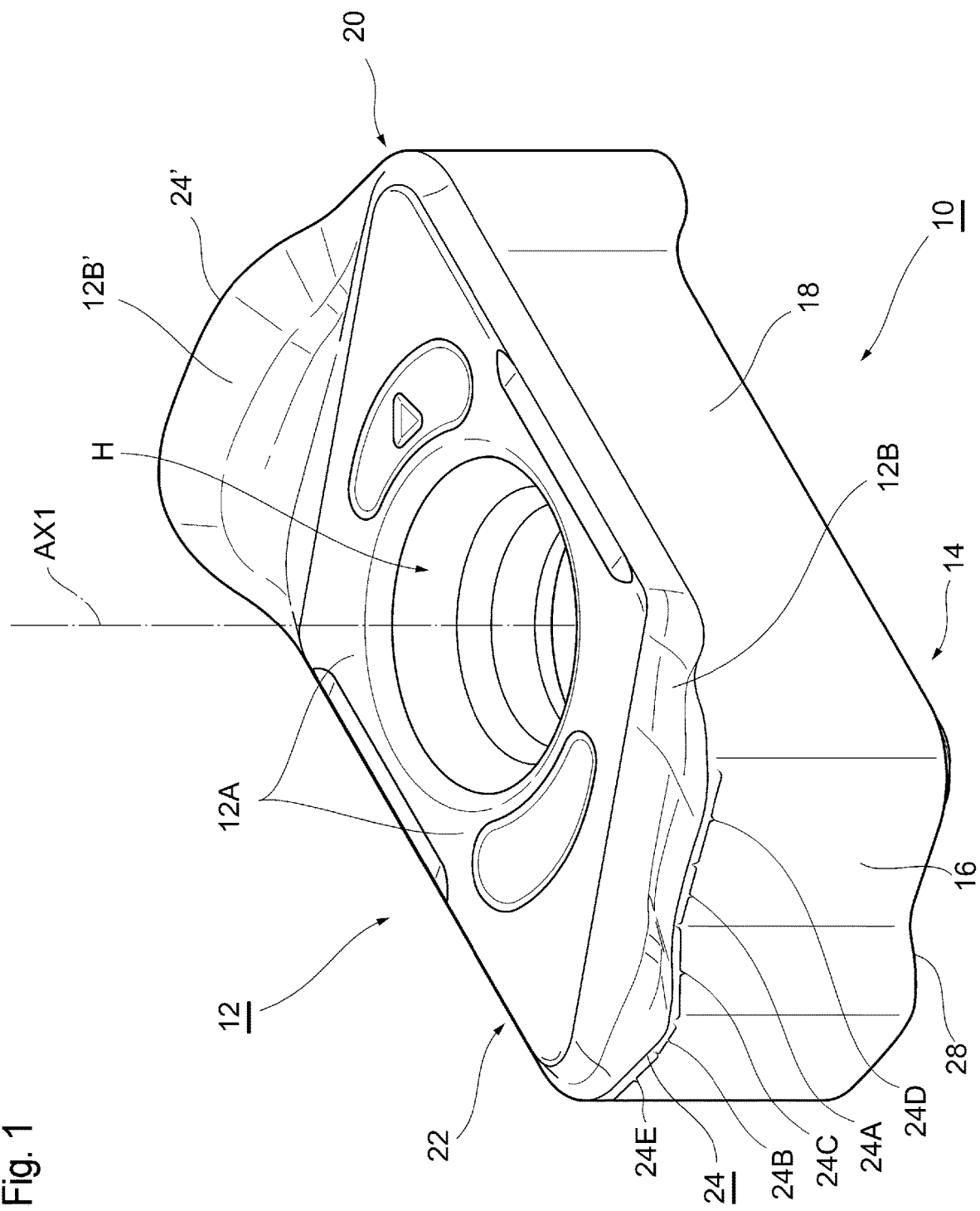
FIG. 1 is a perspective view of a cutting insert 10.

FIG. 1 is a perspective view of a cutting insert 10 according to a first embodiment of the present invention.

Figure 2:
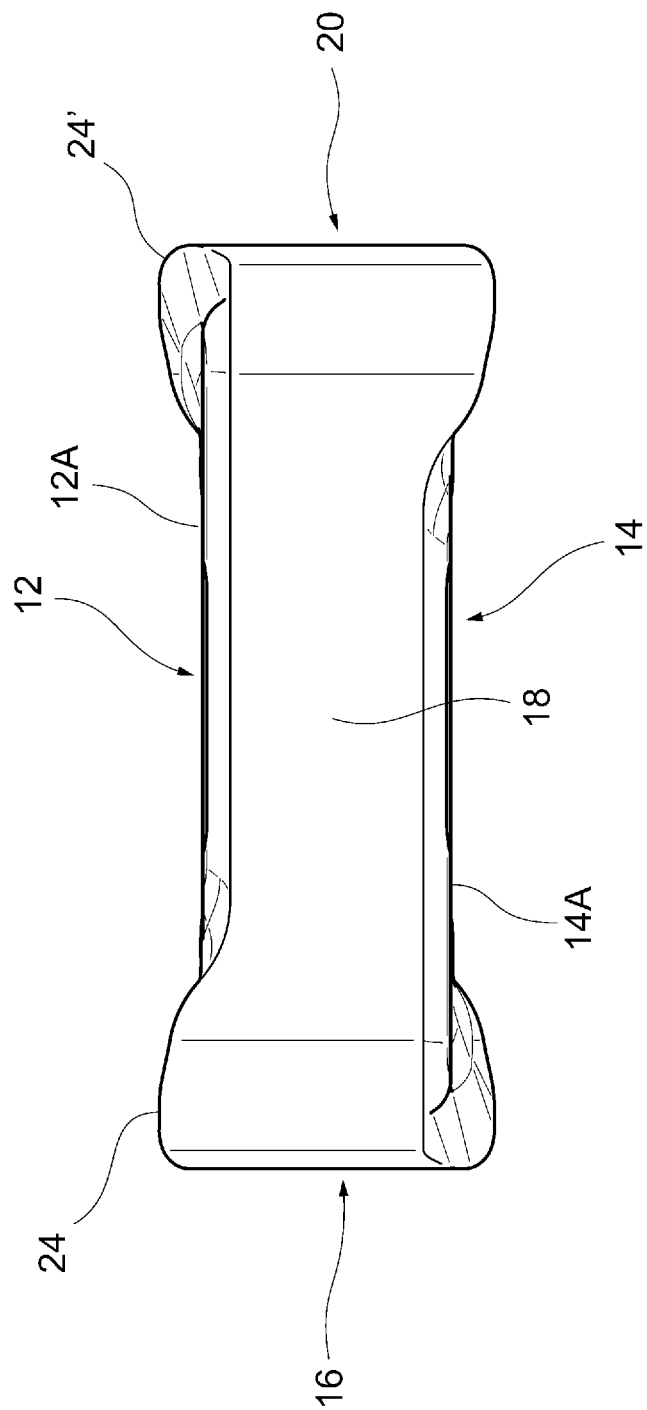
FIG. 2 is a side view in which the cutting insert 10 is seen from a direction facing a second peripheral side surface part 18.
Figure 3:
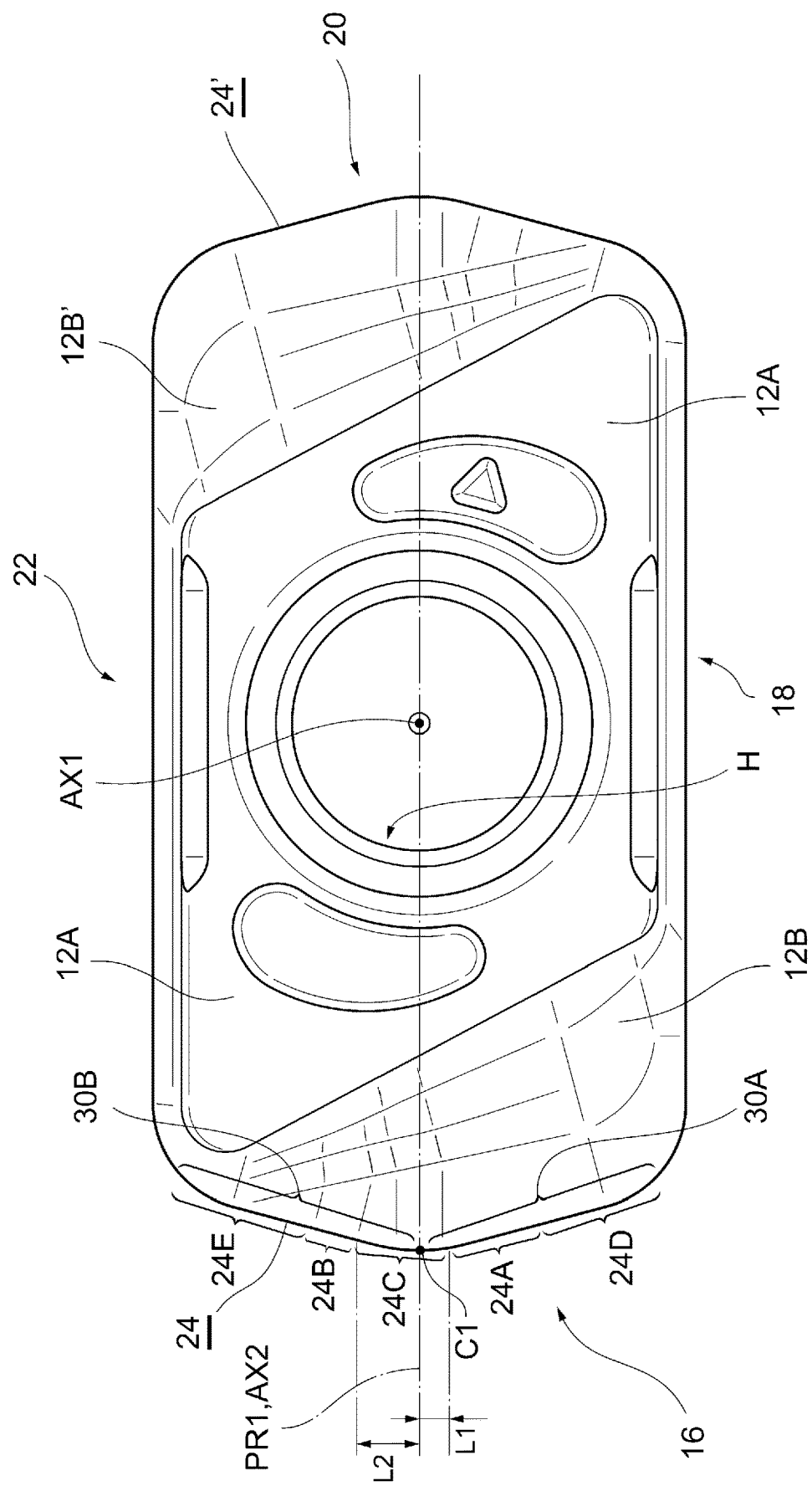
FIG. 3 is an end view in which the cutting insert 10 is seen from a direction facing a first end surface 12.
Figure 4:
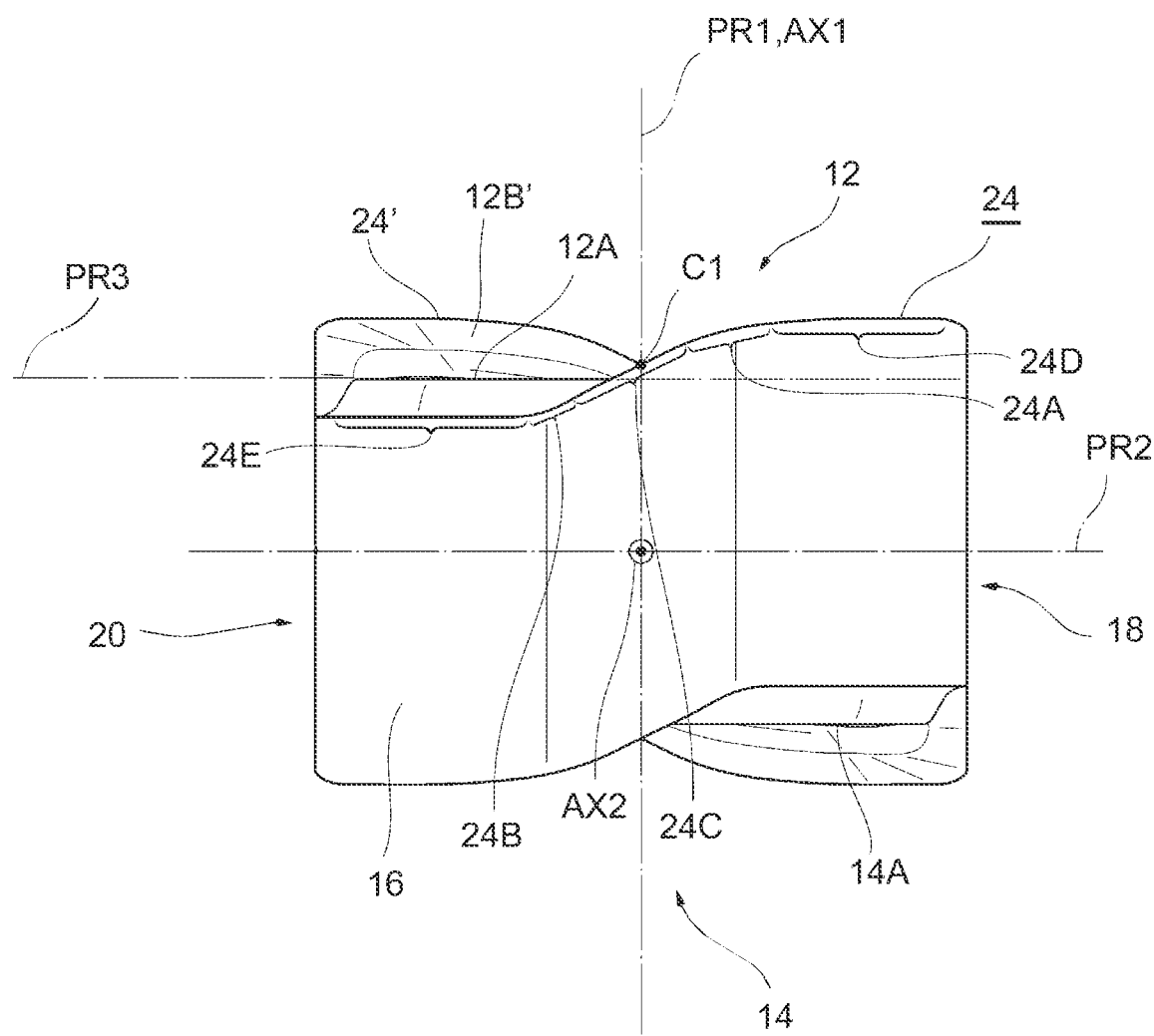
FIG. 4 is a side view in which the cutting insert 10 is seen from a direction facing a first peripheral side surface part 16.

FIG. 2 is a side view (front view) in which the cutting insert 10 is seen from a direction facing a second peripheral side surface part 18. FIG. 3 is an end view (plan view) in which the cutting insert 10 is seen from a direction facing a first end surface 12. FIG. 4 is a side view (left side view) in which the cutting insert 10 is seen from a direction facing a first peripheral side surface part 16.

As shown in FIG. 1, the cutting insert 10 comprises the first end surface 12, which faces upward relative to the plane of the page, and a second end surface 14, which, as opposed to the first end surface 12, faces downward relative to the plane of the page, and also comprises the first peripheral side surface part 16, the second peripheral side surface part 18, a third peripheral side surface part 20 and a fourth peripheral side surface part 22, which connect the first end surface 12 and the second end surface 14. Further, the cutting insert 10 is provided, at a center part thereof, with a through hole H which penetrates the first end surface 12 and the second end surface 14. As shown in FIG. 3, which is the end view of the cutting insert 10 and corresponds to a figure in which the cutting insert 10 is seen from a central axis AX1 direction of the through hole H, the first peripheral side surface part 16 is a surface facing in a first direction, such surface being perpendicular to the central axis AX1 and corresponding to a left direction relative to the plane of the page in FIG. 3; the second peripheral side surface part 18 is a surface located in a second direction which is perpendicular to the central axis AX1 and which corresponds to a downward direction relative to the plane of the page in the same figure; the third peripheral side surface part 20 is a surface located in a third direction which is perpendicular to the central axis AX1 and which corresponds to a right direction relative to the plane of the page in the same figure; and the fourth peripheral side surface part 22 is a surface located in a fourth direction which is perpendicular to the central axis AX1 and which corresponds to an upward direction relative to the plane of the page in the same figure. The first and third directions are parallel to each other, and each of such directions is perpendicular to the second and fourth directions, which are parallel to each other.

The second peripheral side surface part 18 and the fourth peripheral side surface part 22 are formed parallel to each other so as to configure flat surfaces or to be substantially flat, except for connecting portions with respect to either the first peripheral side surface part 16 or the third peripheral side surface part 20, which are located on both sides of each of the second peripheral side surface part 18 and the fourth peripheral side surface part 22.

Further, as shown in FIG. 3, a connecting portion between the first peripheral side surface part 16 and the first end surface 12 comprises a first connecting part 30A, which is inclined in the end view such that the first connecting part 30A travels in the first direction or a width of the cutting insert 10 in a direction parallel to the first direction increases as the first connecting part 30A heads away from the second peripheral side surface part 18 and approaches the fourth peripheral side surface part 22. The above connecting portion further comprises a second connecting part 30B, which is connected to the first connecting part 30A and which is also inclined in the end view such that the second connecting part 30B travels in the third direction or a width of the cutting insert 10 in a direction parallel to the third direction decreases as the second connecting part 30B heads away from the second peripheral side surface part 18 and approaches the fourth peripheral side surface part 22. The first connecting part 30A and the second connecting part 30B are connected with each other at a center point C1. The center point C1 is located at a middle point, in the longitudinal direction of the plane of the page, of the connecting part between the first peripheral side surface part 16 and the first end surface 12. A first virtual plane PR1, which includes the central axis AX1 of the through hole H and which passes through the center point C1, is parallel to each of the second peripheral side surface part 18 and the fourth peripheral side surface part 22.

Figure 9:
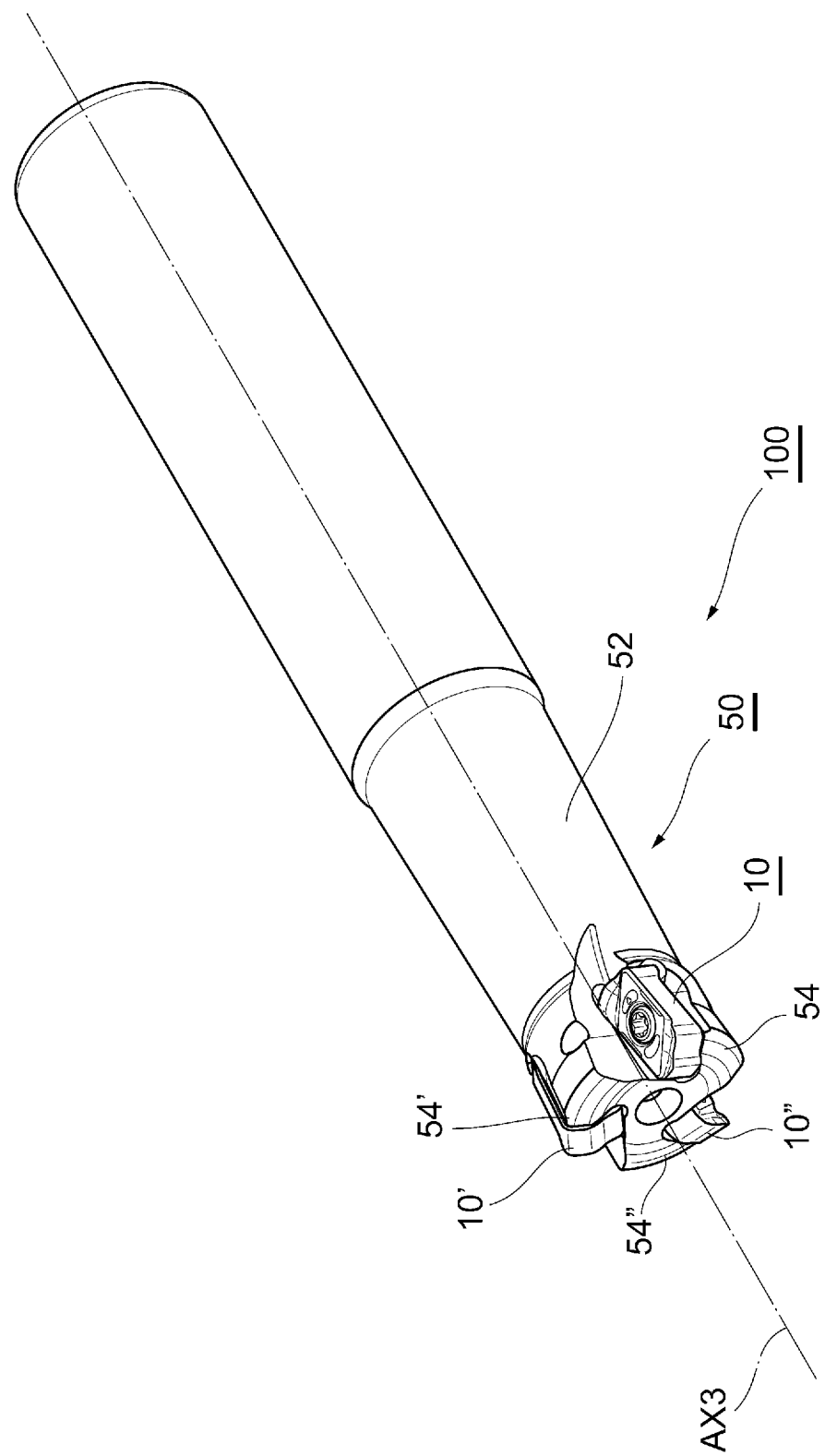
FIG. 9 is a perspective view of an end mill 100.

As shown in FIGS. 1 and 3, the first end surface 12 comprises a flat, boss surface part 12A formed so as to surround the through hole H. As described in detail below, the boss surface part 12A is a surface which, when conducting machining with the use of a cutting edge formed on the second end surface 14 side, comes into contact with an insert seat surface of a body 50 (FIG. 9). A rake surface part 12B, which is formed in a first-direction end of the first end surface 12, and a rake surface part 12B', which is formed in a third-direction end thereof, are configured by curved surfaces in order to achieve a structure appropriate for cutting.

First, description will be made below regarding a cutting edge 24 formed in the connecting part between the first end surface 12, which includes a rake surface, and the first peripheral side surface part 16, which includes a flank.

As shown in FIGS. 3 and 4, the cutting edge 24 is constituted by: a first cutting edge part 24A, a second cutting edge part 24B, a third cutting edge part 24C (an example of a "bottom edge part"), a fourth cutting edge part 24D and a fifth cutting edge part 24E.

The fourth cutting edge part 24D is a cutting edge formed in a part of the first connecting part 30A which is close to the second peripheral side surface part 18, and is also a cutting edge located on the leading end outer periphery side of the body 50 when the cutting insert 10 is mounted on the body 50 (FIG. 9).

As shown in FIG. 4, in which the first peripheral side surface part 16 is seen from the first direction, the fourth cutting edge part 24D is formed so as to have a substantially constant distance from a second virtual plane PR2, which is perpendicular to the first virtual plane PR1, which is located in the middle between the first end surface 12 and the second end surface 14 and which passes through the first peripheral side surface part 16, the second peripheral side surface part 18, the third peripheral side surface part 20 and the fourth peripheral side surface part 22 (provided in such manner as to involve a gradual increase in a narrow sense with a smaller rate of increase as the fourth cutting edge part 24D approaches the second peripheral side surface part 18) and is formed so as to become the most distant from the second virtual plane PR2 from among the first through fifth cutting edge parts 24A-24E.

As shown in FIG. 4 as well, the first cutting edge part 24A is smoothly connected with the fourth cutting edge part 24D, which is formed substantially parallel to the second virtual plane PR2, and is formed in the first connecting part 30A so as to gently approach the second virtual plane PR2. The first cutting edge part 24A is formed in a convex circular-arc shape having a first curvature radius, i.e., formed so as to bulge outward, in a side view in which the first peripheral side surface part 16 is seen from the first direction. Further, as shown in FIG. 3, in the end view, the first cutting edge part 24A is formed so as to be distant, by a first distance L1, from the first virtual plane PR1 (i.e., such that a minimum distance between the first cutting edge part 24A and the first virtual plane PR1 is the first distance L1).

The third cutting edge part 24C is smoothly connected with the first cutting edge part 24A and is formed in a portion which ranges from the first connecting part 30A, through the center point C1, to the second connecting part 30B, so as to approach the second virtual plane PR2. The third cutting edge part 24C is formed linearly in a side view in which the first peripheral side surface part 16 is seen from the first direction. Further, as shown in FIG. 3, in the end view, the third cutting edge part 24C is formed as a bottom edge including the center point C1, at which the first direction distance is at a maximum with respect to the central axis AX1.

The second cutting edge part 24B is smoothly connected with the third cutting edge part 24C and is formed in the second connecting part 30B so as to gently approach the second virtual plane PR2. The second cutting edge part 24B is formed in a concave circular-arc shape having a second curvature radius, i.e., formed so as to be recessed inward, in the side view in which the first peripheral side surface part 16 is seen from the first direction. Herein, the second curvature radius is smaller than the first curvature radius. Thus, the curvature radius of the second cutting edge part 24B is greater than the curvature radius of the first cutting edge part 24A. Further, as shown in FIG. 3, in the end view, the second cutting edge part 24B is formed so as to be distant, by a second distance L2, from the first virtual plane PR1 (i.e., such that a minimum distance between the second cutting edge part 24B and the first virtual plane PR1 serves as the second distance L2). Herein, the second distance L2 is greater than the first distance L1. Thus, the second cutting edge part 24B is formed so as to be more distant from the first virtual plane PR1 than the first cutting edge part 24A.

The fifth cutting edge part 24E is a cutting edge formed in a part of the second connecting part 30B which is close to the fourth peripheral side surface part 22, and is also a cutting edge located on the leading end inner periphery side of the body 50 when the cutting insert 10 is mounted on the body 50 (FIG. 9).

The fifth cutting edge part 24E is formed so as to have a substantially constant distance with respect to the second virtual plane PR2 and to be least distant from the second virtual plane PR2 from among the first through fifth cutting edges 24A-24E.

The cutting edge 24 is constituted by the first through fifth cutting edge parts 24A-24E described above. In the end view, the cutting edge 24 is formed into a V shape with the center point C1 serving as a bottom of such shape. In the side view seen from the first direction, the cutting edge 24 is formed so as to be bent, in a direction nearly parallel to the second virtual plane PR2, by the first cutting edge part 24A in a circular-arc shape, which is connected to one end of the third cutting edge part 24C in a linear shape, which corresponds to the bottom edge including the center part C1, and to be bent, in a direction nearly parallel to the second virtual plane PR2, by the second cutting edge part 24B in a circular-arc shape, such second cutting edge part 24B being connected to the other end thereof and having a curvature radius greater than the first cutting edge part 24A. Therefore, the first cutting edge part 24A is formed so as to be longer than the second cutting edge part 24B, and the third cutting edge part 24C is formed so as to be longer than each of the first cutting edge part 24A and the second cutting edge part 24B. Further, the second cutting edge part 24B is formed at a position which is more distant from the first virtual plane PR1, which passes substantially the center of the cutting insert 10, than the first cutting edge part 24A.

Further, the cutting insert 10 according to the present embodiment is formed so as to be of 180-degree rotational symmetry with respect to the central axis AX1, except for portions thereof not involved in cutting, such as a mark formed in the first end surface 12 so as to indicate the direction (FIG. 3), and is formed so as to be of 180-degree rotational symmetry with respect to a central axis AX2, which serves as an intersection line of the first virtual plane PR1 and the second virtual plane PR2 and passes through a center part of the first peripheral side surface part 16 and a center part of the second peripheral side surface part 18 (FIG. 4). Thus, cutting edges which each have the same shape as the cutting edge 24 are respectively formed in a connecting part between the first end surface 12 and the third peripheral side surface part 20, a connecting part between the second end surface 14 and the first peripheral side surface part 16 and a connecting part between the second end surface 14 and the third peripheral side surface part 20. Therefore, in the connecting part between the first peripheral side surface part 16 and the second end surface 14, a cutting edge having the same shape as the fifth cutting edge part 24E is formed in a connecting part of the first peripheral side surface part 16 which faces the fourth cutting edge part 24D; a cutting shape having the same shape as the fourth cutting edge part 24D is formed in a connecting part thereof which faces the fifth cutting edge part 24E; and a cutting edge having the same shape as the third cutting edge part 24C is formed in a connecting part thereof which faces the third cutting edge part 24C. As a result, as shown in FIG. 4, the length of the first peripheral side surface part 16 in the central axis AX1 direction is substantially constant.

It should be noted that the cutting edge 24 is not necessarily formed throughout the connecting part between the first end surface 12 and the first peripheral side surface part 16; for instance, when the present invention is applied to a cutting insert whose two ends are used for a purpose not involved in cutting, cutting edges are not required to be provided on such two ends. Further, the fourth cutting edge part 24D and the fifth cutting edge part 24E are not limited to those described in the present embodiment; for instance, the fourth cutting edge part 24D may be formed in an inclined manner so as to approach the second virtual plane PR2 as it approaches the second peripheral side surface part 18. Further, the first connecting part 30A and the second connecting part 30B are not required to be provided throughout the connecting part between the first end surface 12 and the first peripheral side surface part 16; for instance, different structures may be employed at two ends of such connecting part. However, inclinations corresponding to the first connecting part 30A and the second connecting part 30B need to be formed around a center part of such connecting part which includes the center point C1. Further, the center point C1 is not required to be provided at the middle point of the connecting part between the first end surface 12 and the first peripheral side surface part 16, and two inclinations corresponding to the first connecting part 30A and the second connecting part 30B may be provided such that a point corresponding to the center point C1 is located at, for example, a position slightly distant from such middle point.

Figure 5:
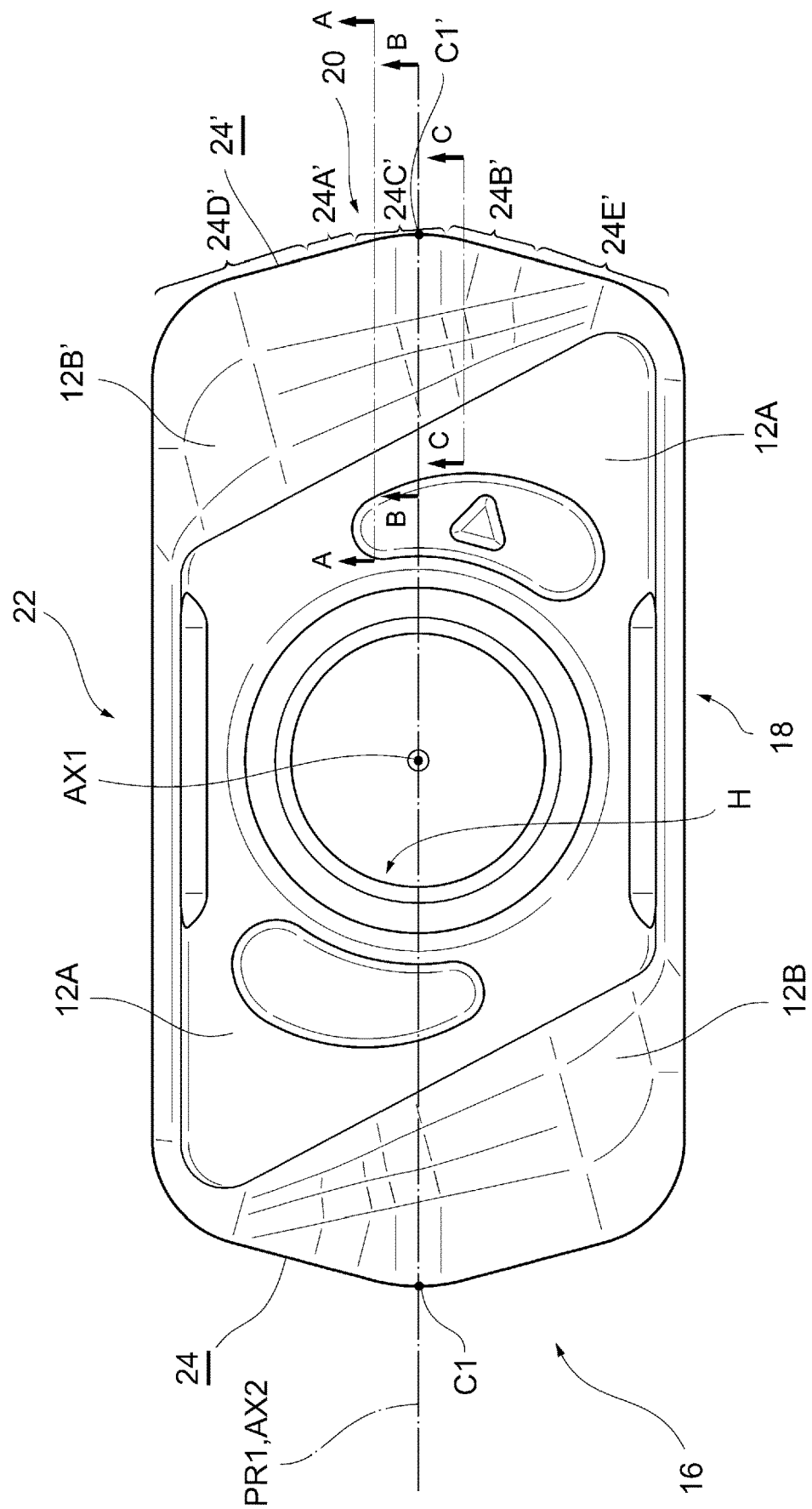
FIG. 5 is an end view in which the cutting insert 10 is seen from the direction facing the first end surface 12.

Next, description will be made regarding the structure of a rake surface of the cutting insert 10. FIG. 5 is an end view in which the cutting insert 10 is seen from the direction facing the first end surface 12 including a rake surface. Since, as described above, a cutting edge having the same structure as the cutting edge 24 is formed in the connecting part between the first surface 12 and the third peripheral side surface part 20 so as to constitute 180-degree rotational symmetry with respect to the central axis AX1, elements having the same structure will be denoted using either the same symbols or the same symbols with primes, and repeated descriptions of such elements will be simplified or omitted.

Figure 6:
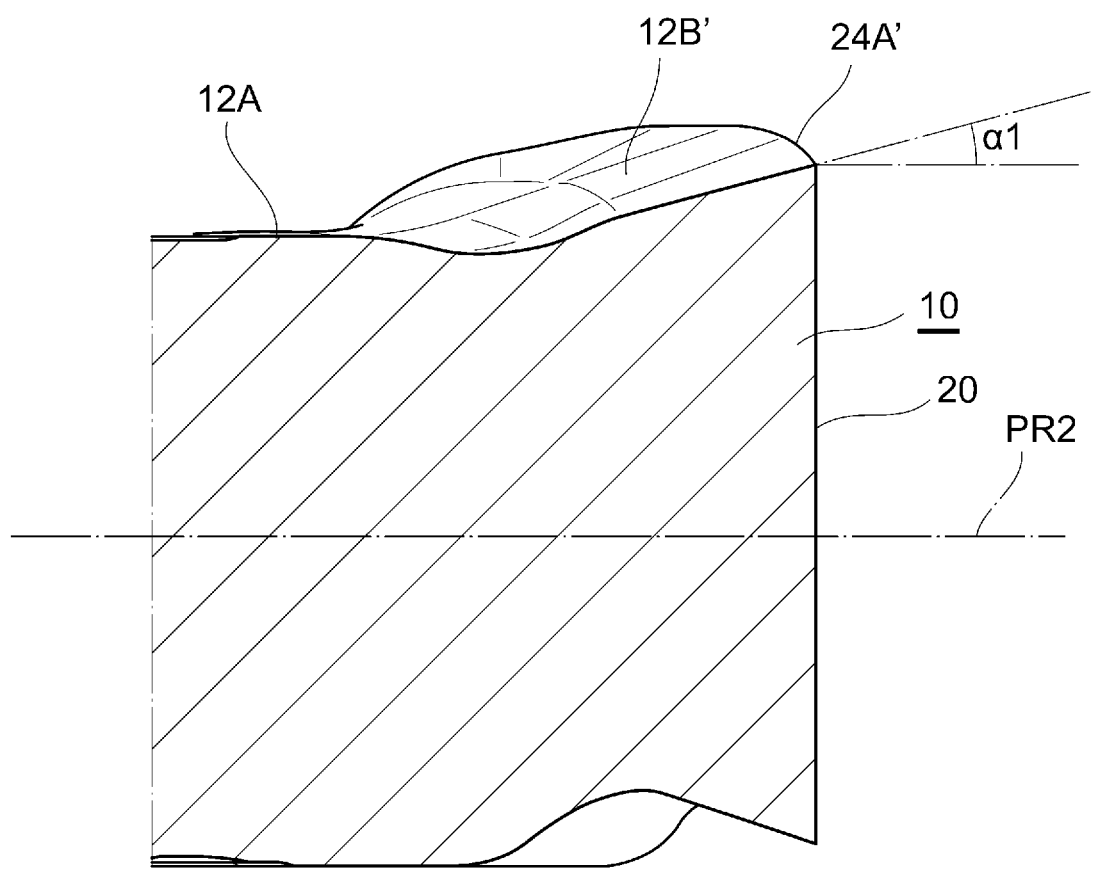
FIG. 6 is an A-A cross-sectional view of the cutting insert 10.
Figure 7:
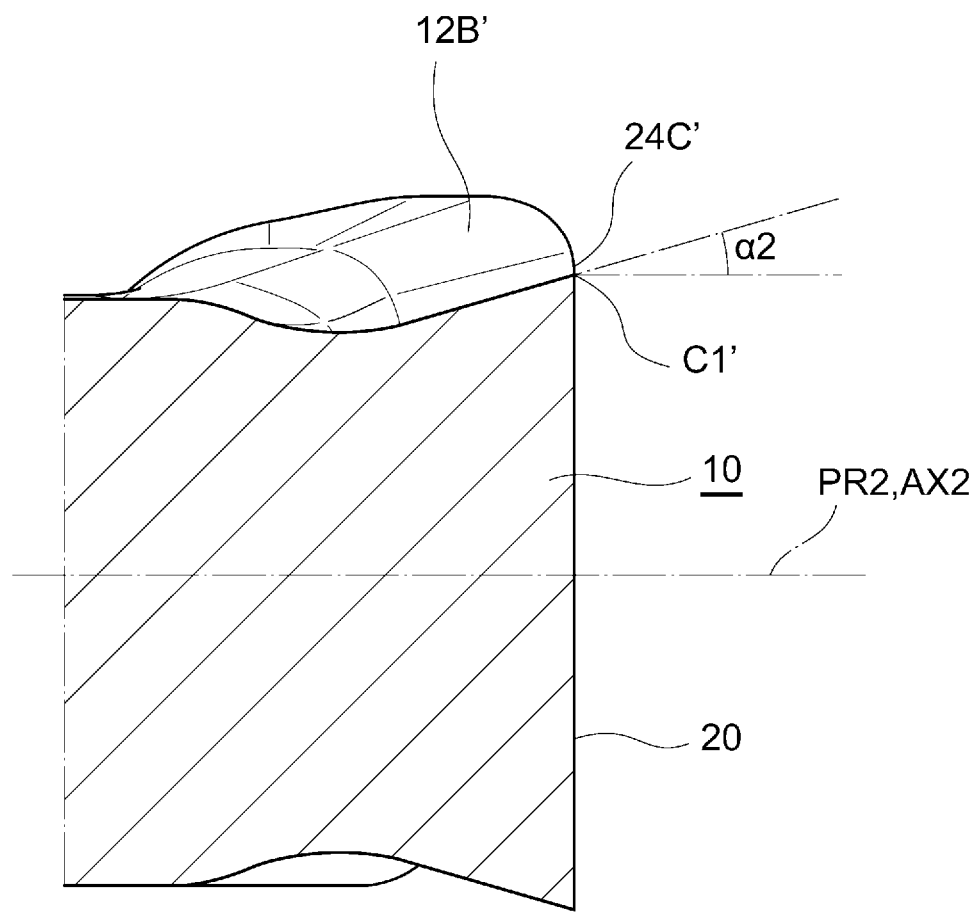
FIG. 7 is a B-B cross-sectional view of the cutting insert 10.
Figure 8:
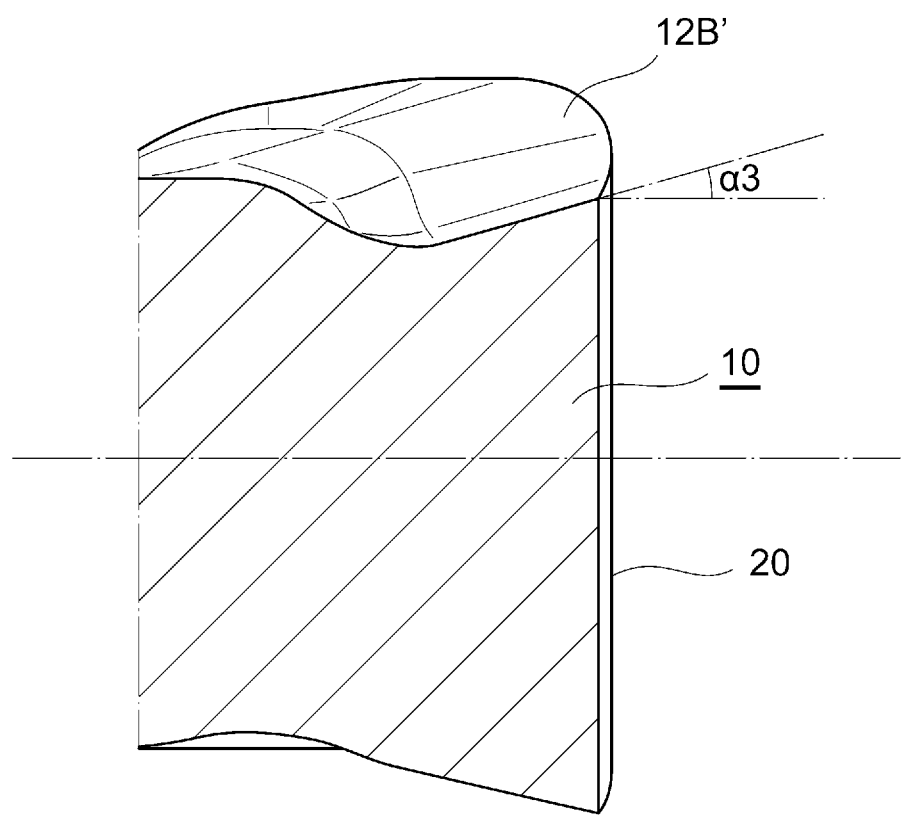
FIG. 8 is a C-C cross-sectional view of the cutting insert 10.

As shown in FIG. 5, a first cutting edge part 24A' through a fifth cutting edge part 24E' are formed in the connecting part between the first end surface 12 and the third peripheral side surface part 20. FIGS. 6, 7 and 8 are, respectively, a cross-sectional view of an A-A cross-section in FIG. 5, a cross-sectional view of a B-B cross-section in FIG. 5, and a cross-sectional view of a C-C cross-section in FIG. 5. Herein, the B-B cross-section is a cross-section included in the first virtual plane PR1 and including a center point C1' corresponding to the center point C1. The A-A cross-section is a cross-section located distant, by the first distance L1, from the first virtual plane PR1 toward the fourth peripheral side surface part 22, and accordingly covers a position connecting the first cutting edge part 24A' and the third cutting edge part 24C'. The C-C cross-section is a cross-section located distant, by the first distance L1, from the first virtual plane PR1 toward the second peripheral side surface part 18, and accordingly is a cross-section located where the third cutting edge part 24C' is formed.

A rake angle with respect to the second virtual plane PR2 in the cutting insert 10 according to the present embodiment gradually increases in a narrow sense, ranging from a connecting point between the first cutting edge part 24A' and the third cutting edge part 24C', via the center point C1', to a position between the center point C1' and the second cutting edge part 24B'. Then, after having reached the maximum value, the above rake angle gradually decreases in a narrow sense, ranging, via a connecting point between the third cutting edge part 24C' and the second cutting edge part 24B', to a midpoint of the fifth cutting edge part 24E'. In other words, a rake angle of the cutting edge 24 has a maximum positive rake angle at a position between the center point C1 and the connecting point between the third cutting edge part 24C' and the second cutting edge part 24B', and, with such position serving as a peak, such rake angle gradually decreases in a narrow sense, ranging to the first cutting edge part 24A', in terms of a direction facing the fourth peripheral side surface part 22, and such rake angle also gradually decreases in a narrow sense, ranging, via the second cutting edge part 24B', to a point of the fifth cutting edge part 24E', in terms of the direction facing the second peripheral side surface part 18. It should be noted that the insert seat surface of the body 50 is formed such that an axial rake angle when the cutting insert 10 is mounted on the body 50 has the same relationship as that described above.

As shown in FIG. 6, a positive rake angle $\alpha 1$ at the connecting point between the first cutting edge part 24A' and the third cutting edge part 24C' is 15 degrees, and a rake angle in the first cutting edge part 24A' has substantially the same value. Starting from the position here, the rake angle gradually increases, and a positive rake angle $\alpha 2$ at the center point C1' is 16 degrees, as shown in FIG. 7. Starting from the position here, the rake angle further gradually increases, and a positive rake angle $\alpha 3$ in the C-C cross-section shown in FIG. 8 is 18 degrees. The rake angle then gradually decreases and is less than 10 degrees in the fifth cutting edge part 24E'. The rake surface part 12B' is formed such that the cutting edge 24' has the rake angle described above. Since the cutting insert 10 is formed so as to be of 180-degree rotational symmetry with respect to the central axis AX1, the cutting edge 24 and the rake surface part 12B respectively have the same shapes as the cutting edge 24' and the rake surface part 12B'.

Next, using FIG. 4, description will be made regarding the position of the boss surface part 12A. As shown in the same figure, the boss surface part 12A is formed so as to serve as a flat surface parallel to the second virtual plane PR2. Further, a distance between the boss surface part 12A and the second virtual plane PR2 is greater than a distance between the second cutting edge part 24B and the second virtual plane PR2 and is smaller than a distance between the first cutting edge part 24A and the second virtual plane PR2. That is, the boss surface part 12A is formed such that a third virtual plane PR3 which includes the boss surface part 12A and the third cutting edge part 24C intersect with each other.

FIG. 9 is a perspective view of an end mill 100 in which the cutting insert 10 and two cutting inserts 10' and 10", each having the same shape as the cutting insert 10, are mounted on the body 50. As shown in the same figure, the body 50 comprises a cylindrical shank 52, and, at a leading end of a rotational axis AX3 thereof, three insert seat surfaces 54, 54' and 54", each having the same structure, for holding the cutting inserts are formed around the rotational axis AX3 at 120-degree intervals. The insert seat surface 54 has a flat surface part, and a female thread is formed so as to be opened in this flat surface part. A male screw, which penetrates the through hole H of the cutting insert 10, is screwed into this female thread, whereby a head of the male screw presses the boss surface part 12A of the first end surface 12, and a boss surface part 14A formed in the second end surface 14 is brought into contact with the flat surface part of the insert seat surface 54, as a result of which the cutting insert 10 is fixed to the body 50. In a leading end view seen from a rotational axis AX3 direction of the body 50, the insert seat surface 54 is formed such that at least one tangential line connecting the rotational axis AX3 and the cutting edge 24 of the cutting insert 10 passes through a point of the first cutting edge part 24A. The cutting inserts 10' and 10" are respectively mounted on the insert seat surfaces 54' and 54" of the body 50 in the same manner as described above. Since the cutting insert 10 is formed so as to be of 180-degree rotational symmetry with respect to the central axis AX1, after the cutting edge 24 has fractured, cutting can be conducting using the cutting edge 24', and, since the cutting insert 10 is formed so as to be of 180-degree rotational symmetry with respect to the central axis AX2, after the cutting edge 24' has fractured, cutting can be conducted by sequentially using the two cutting edges formed on the second end surface 14 side.

Using the end mill 100 described above, description will be made below regarding the effect obtained when cutting is conducted using a brittle material, such as stainless steel, as a workpiece material.

When the cutting insert 10 is rotated around the rotational axis AX3, the cutting edge 24 bites the workpiece material, and cutting is then started. At this time, although it depends on the cutting conditions including the area of the region to be cut, when the cutting insert 10 is mounted such that the first cutting edge part 24A is located at the leading end in a rotating direction around the rotational axis AX3, this allows the first cutting edge part 24A to easily bite the workpiece material. The first cutting edge part 24A is formed in a circular-arc shape having a greater curvature radius than that of the third cutting edge part 24C, and this makes it easy to stretch chips so as to be thin; therefore, even in high-speed cutting, cutting resistance applied onto the first cutting edge part 24A is reduced, whereby the life of the cutting insert 10 can be extended. Moreover, since the first cutting edge part 24A is formed in a circular-arc shape, chips can easily be separated in the right and left directions, i.e. chips can easily be separated into: chips which extend toward the second peripheral side surface part 18 located on the outer periphery side; and chips which extend toward the fourth peripheral side surface part 22 located on the inner periphery side. At this time, the rake surface part 12B is formed such that a rake angle of the third cutting edge part 24C adjacent, on the inner periphery side, to the first cutting edge part 24A is greater than a rake angle of the first cutting edge part 24A. Thus, when chips traveling from the first cutting edge part 24A toward the inner periphery come into contact with the rake surface part 12B, this prevents the cutting insert 10 from receiving cutting resistance and also prevents chips from being curled and then travelling toward the first peripheral side surface part 16, and in turn prevents chip packing from being caused, whereby the stretching of chips is facilitated. However, machining may be started from, for example, the third cutting edge part 24C located around the center point C1, depending on the machining conditions.

Further, the first cutting edge part 24A is formed so as to be more distant toward the outer periphery than the center part C1. Using cutting inserts having various shapes, the present inventors have conducted simulation or actual cutting and thereby performed a comparison concerning, for example, the shape of a chip produced, fracturing of a cutting edge, cutting resistance and the temperature of the cutting insert; as a result, it has been found that, if a cutting edge corresponding to the first cutting edge part 24A is formed around the center point C1, most of the chips are stretched toward the outer periphery, and, particularly when machining is conducted while the cutting insert 10 is continuously located in a closed space surrounded by multiple inner wall surfaces of a workpiece material which are formed through the cutting of the workpiece material by the cutting insert 10, chips are highly likely to be trapped between the cutting insert 10 and an inner wall surface of the workpiece material which faces toward the outer periphery of the cutting insert 10 so that chip packing is caused. In the cutting insert 10, since the first cutting edge part 24A, which is expected to bite a workpiece material, is distant from the center point C1 by the distance corresponding to the first distance L1, chips are easily dispersed to the left and right. Further, given that the third cutting edge part 24C formed in a linear shape cuts the workpiece material after the first cutting edge part 24A bites such workpiece material, this can facilitate resistance to chips to being curled and the stretching of such chips, compared with the case of conducting cutting with a cutting edge having a large curvature radius. Here, in order to secure the thickness of a cutting insert to a certain degree, it is necessary to provide the second cutting edge part 24B in a circular-arc shape, which is connected to the third cutting edge part 24C, and the second cutting edge part 24B is provided so as to be distant, by the second distance L2, which is greater than the first distance L1, from the center point C1. This reduces the possibility of the second cutting edge part 24B being involved in cutting, such second cutting edge part 24B having a large curvature and in turn being prone to serve as the factor for chip curling if it is involved in cutting, thereby making it possible to complete cutting, mainly using the first cutting edge part 24A having a small curvature and the third cutting edge part 24C having a smaller curvature or a curvature of zero.

The fourth cutting edge part 24D is preferably formed so as to be parallel to the second virtual plane PR2 or such that, as it approaches the second peripheral side surface part 18, the distance from the second virtual plane PR2 increases. Such configuration can reduce the possibility of excessive chips stretched toward the outer periphery causing chip packing when a closed space, such as a groove, is machined. However, the present invention is not limited thereto. For instance, in a cutting insert not intended to involve the machining of a closed space, a cutting edge located at the position corresponding to the fourth cutting edge part 24D may be formed such that, as it approaches the second peripheral side surface part 18, the distance from the second virtual plane PR2 decreases. Such formation facilitates the stretching of chips toward the outside in a radial direction while the first cutting edge part 24A becomes more likely to bite a workpiece material.

Since the boss surface part 12A is formed at a position more distant from the second virtual plane PR2 than the second cutting edge part 24B, this can reduce the possibility of chips produced by the first cutting edge part 24A and the third cutting edge part 24C colliding with the boss surface part 12A and in turn damaging the boss surface part 12A. Chips that have collided with the boss surface part 12A impair machining stability and also impair fixability when the boss surface part 12A is brought into contact with the body 50.

Here, it should be noted that the third cutting edge part 24C may not necessarily be configured by a straight line and may instead be configured by a curve; however, such curve preferably has a curvature radius greater than that of the first cutting edge part 24A.

The boss surface part 12A may be configured by a curved surface for being fixed to the body 50.

REFERENCE SIGNS LIST

10: Cutting insert, 12: First end surface, 12A: Boss surface part, 12B: Rake surface part, 14: Second end surface, 14A: Boss surface part, 16: First peripheral side surface part, 18: Second peripheral side surface part, 20: Third peripheral side surface part, 22: Fourth peripheral side surface part, 24: Cutting edge, 30A: Connecting part, 30B: Connecting part, 50: Body, 52: Shank, 54: Insert seat surface, 100: End mill.

What is claimed is:

1. A cutting insert comprising:
    a first end surface;
    a second end surface opposite to the first end surface;
    a through hole which penetrates the first end surface and the second end surface;
    a peripheral side surface which connects the first end surface and the second end surface and which comprises a first peripheral side surface part facing in a first direction, a second peripheral side surface part facing in a second direction perpendicular to the first direction, a third peripheral side surface part facing in a third direction perpendicular to the second direction, and a fourth peripheral side surface part facing in a fourth direction perpendicular to the third direction; and
    a cutting edge formed in at least part of a connecting part between the first end surface and the first peripheral side surface part, the cutting insert being rotated around a predetermined rotational axis relative to a workpiece material so that the cutting edge cuts the workpiece material, wherein:
    in an end view in which the cutting insert is seen from a direction facing the first end surface, the connecting part between the first end surface and the first peripheral side surface part comprises a first connecting part which is inclined such that the first connecting part travels in the first direction as it heads away from the second peripheral side surface part and approaches the fourth peripheral side surface part, and also comprises a second connecting part which is connected to a center point serving as an end of the first connecting part, the second connecting part being inclined such that the second connecting part travels in the third direction as it heads away from the second peripheral side surface part and approaches the fourth peripheral side surface part;
    the cutting edge comprises: a first cutting edge part which has, in a side view seen from a direction facing the first peripheral side surface part, a convex circular-arc shape having a first curvature radius and which is formed on the first connecting part so as to be distant, by a first distance, from a virtual plane that is parallel to the first direction and the third direction and perpendicular to the second direction and the fourth direction, and that includes the center point, the center point being at the center of the connecting part between the first peripheral side surface part and the first end surface; a second cutting edge part which has, in the side view, a concave circular-arc shape having a second curvature radius smaller than the first curvature radius and which is formed on the second connecting part so as to be distant, by a second distance greater than the first distance, from the virtual plane; and a bottom third cutting edge part formed in a portion which ranges from the first connecting part to the second connecting part in order to connect the first cutting edge part and the second cutting edge part;
    a distance between the first cutting edge part and a second virtual plane, which is perpendicular to the virtual plane and passes through the first peripheral side surface part, the second peripheral side surface part, the third peripheral side surface part, and the fourth peripheral side surface part, is greater than a distance between the second virtual plane and the bottom third cutting edge part, and a distance between the second virtual plane and the second cutting edge part is less than the distance between the second virtual plane and the bottom third cutting edge part;
    the cutting edge further comprises a fourth cutting edge part disposed at a distance from the second virtual plane and located between the first cutting edge part and the second peripheral side surface part, and a fifth cutting edge part disposed at a distance from the second virtual plane and located between the second cutting edge part and the fourth peripheral side surface part;
    the distance between the second virtual plane and the fourth cutting edge part is greater than the distance between the second virtual plane and each of the first cutting edge part, the second cutting edge part, the bottom third cutting edge part, and the fifth cutting edge part; and
    the distance between the second virtual plane and the fifth cutting edge part is less than the distance between the second virtual plane and each of the first cutting edge part, the second cutting edge part, the bottom third cutting edge part, and the fourth cutting edge part.

2. The cutting insert according to claim 1, wherein a rake angle of the cutting edge with respect to the second virtual plane has a positive value at a connecting point between the first cutting edge part and the bottom third cutting edge part, and gradually increases ranging from the connecting point to the center point.

3. The cutting insert according to claim 1, wherein the virtual plane includes a central axis of the through hole.

4. The cutting insert according to claim 3, wherein the cutting insert is formed so as to be of 180-degree rotational symmetry with respect to the central axis of the through hole.

5. The cutting insert according to claim 3, wherein the cutting insert is formed so as to be of 180-degree rotational symmetry with respect to a second central axis which is perpendicular to the central axis of the through hole and which passes through the first peripheral side surface part and the third peripheral side surface part.

6. The cutting insert according to claim 3, wherein:
the first end surface includes a flat surface part surrounding the through hole; and
in the side view, a third virtual plane which includes the flat surface part intersects with the bottom edge part, and the second cutting edge part is formed between the flat surface and the second end surface.

7. A cutting tool comprising:
a body rotated around a rotational axis and including an insert seat for holding a cutting insert; and
the cutting insert according to claim 1 which is mounted on the body such that the second end surface comes into contact with the insert seat.

* * * * *